(12) United States Patent
Ogasawara

(10) Patent No.: US 9,958,560 B1
(45) Date of Patent: May 1, 2018

(54) NEUTRON IMAGER WITH SPACED DIAMOND DETECTOR ARRAYS

(71) Applicant: Southwest Research Institute, San Antonio, TX (US)

(72) Inventor: Keiichi Ogasawara, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days. days.

(21) Appl. No.: 15/795,302

(22) Filed: Oct. 27, 2017

Related U.S. Application Data

(60) Provisional application No. 62/416,116, filed on Nov. 1, 2016.

(51) Int. Cl.
*G01T 3/00* (2006.01)

(52) U.S. Cl.
CPC .............. *G01T 3/003* (2013.01); *G01T 3/005* (2013.01)

(58) Field of Classification Search
CPC ........... G01T 3/00; G01T 3/06; G01V 5/0091; G01V 5/107; G01J 3/2823
See application file for complete search history.

(56) References Cited

U.S. PATENT DOCUMENTS 3,805,078 A * 4/1974 Kozlov .................... G01T 3/08
250/370.04

OTHER PUBLICATIONS

Fregeau et al. "First use of single-crystal diamonds as fission-fragment detector" Nuclear Instruments and Methods in Physics Research A 791, 2015, Elsevier p. 58-64.*
Rebal, et al; Diamond Detectors for fast neutron measurements at pulsed spallation sources; 2d International Workshop on Fast Neutron Detectors and Applications, Nov. 6-11, 2011.

* cited by examiner

*Primary Examiner* — David Porta
*Assistant Examiner* — Mamadou Faye
(74) *Attorney, Agent, or Firm* — Livingston Law Firm

(57) ABSTRACT

A neutron detector system, with a detector having a pair of spaced diamond detector layers, sandwiched between outer silicon layers. In response to incident neutrons, the detector system measures pulse heights and response times, and from those measurements, calculates the carbon recoil energy and time of flight of scattered neutrons. This data is further used to calculate a "direction cone", which represents the approximate angle of arrival of the incident neutron. These direction cones can be used to image neutron events.

15 Claims, 9 Drawing Sheets

| | ENERGY (eV) | MATERIAL | ACTIVE ATOM DENSITY (#/cc) | CROSS SECTION (BARNS) | DETECTION RATE (%/mm) |
|---|---|---|---|---|---|
| EPITHERMAL | 100k | BC454 | $1.1 \times 10^{21}$ ($^{10}B$) | 6 (CAPTURE AT 10 keV) | 0.07 |
| | 100k | DIAMOND | $1.8 \times 10^{23}$ | 5 (ELASTIC) | 8.6 |
| FAST | 1M | BC454 | $1.1 \times 10^{21}$ ($^{10}B$) | 2 (CAPTURE AT 100 keV) | 0.02 |
| | 1M | DIAMOND | $1.8 \times 10^{23}$ | 2.3 (ELASTIC) | 4.1 |
| FISSION | 10M | BC454 | $1.1 \times 10^{21}$ ($^{10}B$) | 0.5 (CAPTURE AT 1 MeV) | 0.005 |
| | 10M | DIAMOND | $1.8 \times 10^{23}$ | 1 (CAPTURE) | 1.8 |

FIG. 7

|  | LRO/LEND | LPNS | DIAMOND DETECTOR |
|---|---|---|---|
| COLLIMATOR | YES | NO | NO |
| ANGULAR RESOLUTION | 20° (<100 eV) MODERATE (>100 eV) | OMNI-DIRECTIONAL | <10° (<10 MeV) AND OMNI-DIRECTIONAL (>5.7 MeV CAPTURE) |
| SPATIAL RESOLUTION (50 km) | ~18 km | ~45 km | ~9 km FOR <10 MeV ~4.4 km FOR <3 MeV |
| SPATIAL RESOLUTION (10 km) | ~3.6 km | ~10 km | ~1.8 km FOR <10 MeV ~0.9 km FOR <3 MeV |

NEUTRON IMAGER WITH SPACED DIAMOND DETECTOR ARRAYS

CROSS-REFERENCE TO RELATED APPLICATION

This application claims the benefit of U.S. Provisional Application No. 62/416,116, filed Nov. 1, 2016.

TECHNICAL FIELD OF THE INVENTION

This invention relates to neutron detection and imaging, and more particularly to a neutron imager using diamond detector arrays.

BACKGROUND OF THE INVENTION

Neutron detection is the effective detection of neutrons entering a detector instrument that receives and measures an incoming neutron flux. Two key aspects to effective neutron detection are its hardware and software. Detection hardware refers to the kind of neutron detector used and the electronics used for detection. Detection software consists of analysis tools that perform analysis tasks to measure the number and energies of neutrons striking the detector.

One approach to neutron imaging uses scintillator arrays, which rely on neutrons' elastic scattering properties with protons. Neutrons collide with the nucleus of atoms in the scintillator, transferring energy to create a proton recoil and emit light, which is then detected by photomultiplier tubes. The scattered neutron speed is measured with the time-of-flight information between two sets of scintillator arrays using arrival timing measurements.

Important applications of neutron imagers are for space missions and for ground-based or air-based radioactivity monitors. However, previous neutron imagers that have used proportional counters or scintillators connected to photomultiplier tubes are bulky and power-consuming. These characteristics make these systems unsuitable for space missions, small unmanned aircraft, and hand-held devices. In addition, these systems are highly sensitive to many types of radiations, making them unsuitable for use in environments with high background radiation levels.

Diamond detectors are another approach to neutron detection. Instead of the proton-neutron scatterings used by scintillators, diamond detectors rely on carbon-neutron scatterings. Diamond detectors have a fast response time, in the order of sub-nanoseconds (ns). They are also small in size. These properties make diamond detectors an attractive choice for imaging fast neutrons in applications with space, power, and mass constraints. With their additional characteristic of the radiation hardness of the detection material, diamond detectors can be ideal for highly radioactive environments such as deep space and nuclear reactor sites.

DESCRIPTION OF THE DRAWINGS

FIG. 7 is a table summarizing theoretical estimates of linear attenuation coefficients for the diamond detector 10 compared to an existing BC454 neutron detector.

DETAILED DESCRIPTION OF THE INVENTION

The following description is directed to neutron detection, based on epithermal and fast neutron elastic scatterings. As explained below, the neutron detector uses two spaced diamond detector arrays as the scattering media and sensors. The neutron detection system measures both carbon recoil energies and neutron arrival timings to determine the arrival direction of neutrons. From this data, images representing neutron events can be constructed.

Overview Of Detector

Figure 1:
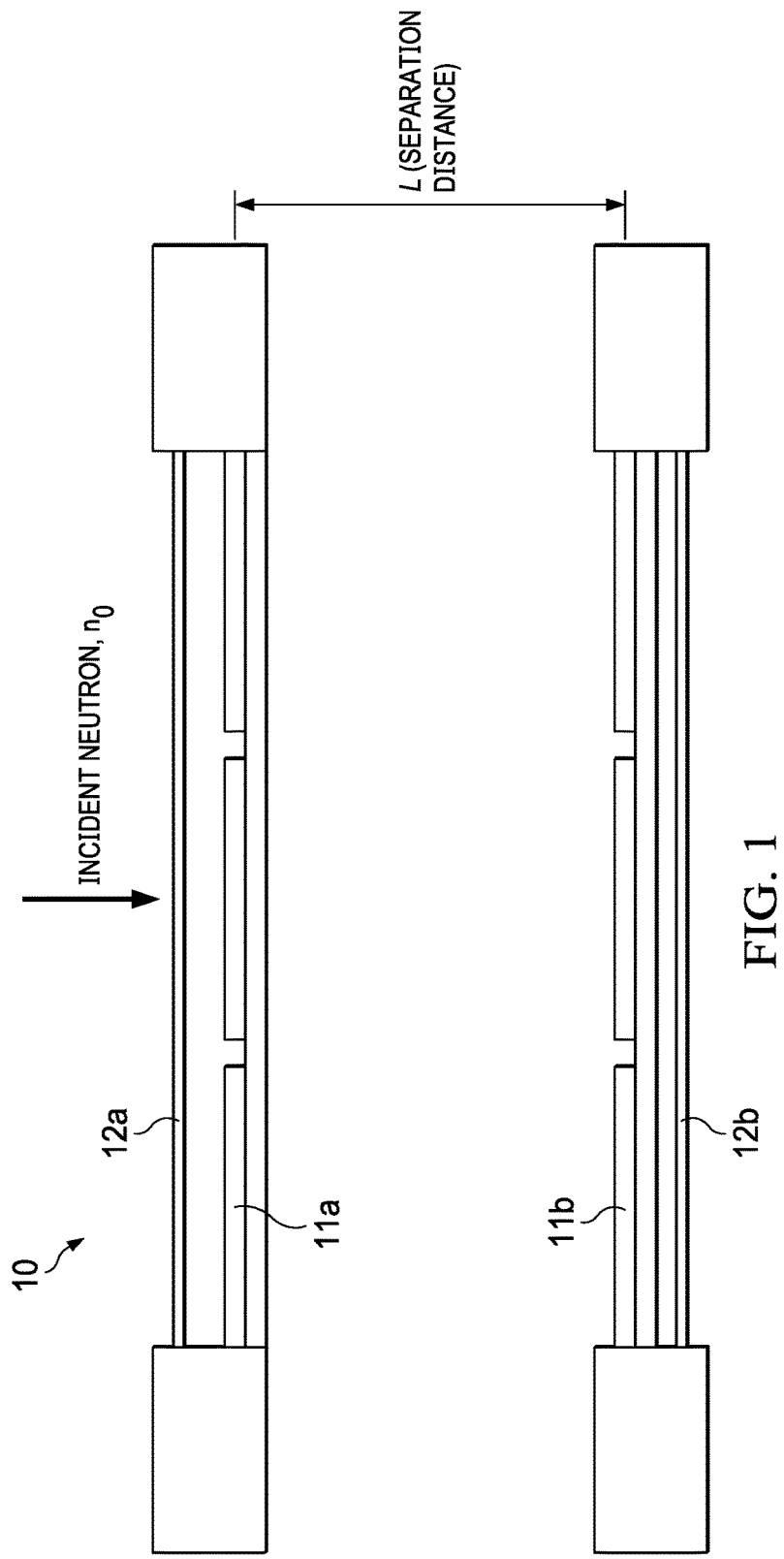
FIG. 1 is a side view of the neutron detector.
Figure 2:
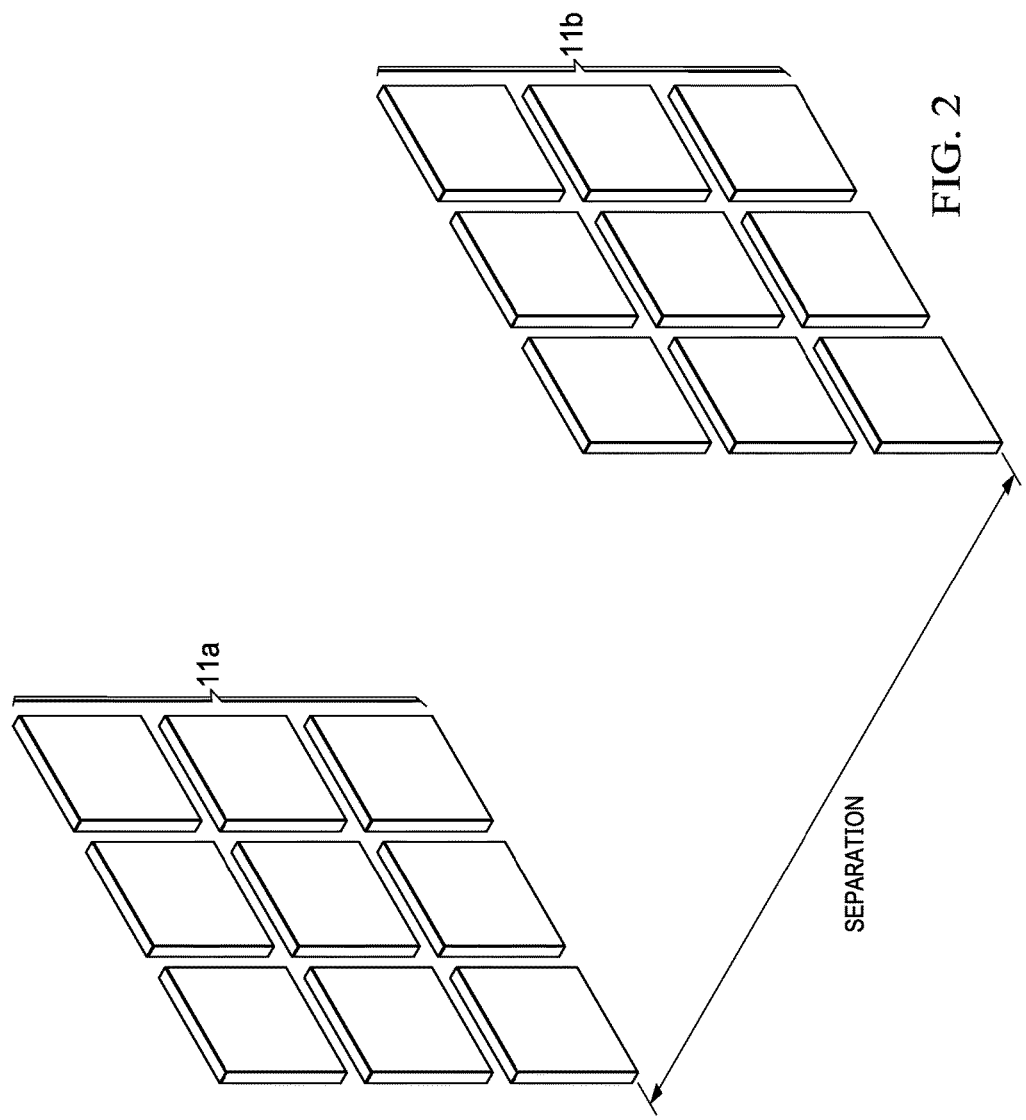
FIG. 2 is a perspective view of the neutron detector.

FIG. 1 is a side view, and FIG. 2 is a perspective view, of the neutron detector 10. Detector 10 is a "two-stage" detector, having a pair of diamond detector layers 11a and 11b. Each diamond detector layer 11a and 11b has an associated thin silicon layer 12a and 12b, respectively.

Each diamond detector layer 11a and 11b is an array of single-crystal diamond detectors. An example of a suitable diamond detector array for layer 11a or 11b is a three-by-three array, with a total of nine pieces. A typical size for each piece is 7 mm×7 mm×0.5 mm in width, length, and thickness, respectively. Countless examples described herein refer to 5 mm×5 mm×0.5 mm pieces.

These layers of diamond detector arrays and silicon form a "sandwich", with the silicon layers 12a and 12b on the outer sides of the detector 10. The two diamond detector arrays 11a and 11b are on the inside. As explained below, this configuration results in two scatterings of an incident neutron, $n_0$, which has entered the detector 10 from the direction indicated by the arrow.

The distance, L, between the diamond detector arrays 11a and 11b may vary. A typical range of this separation distance is 20 to 100 mm.

As explained below, silicon layers 12a and 12b are instrumental for background rejection. A typical thickness of each silicon layer 12a and 12b is 0.06 mm. Silicon layers 12a and 12b may be further described as "thin silicon solid-state detector (SSD) layers".

Figure 3:
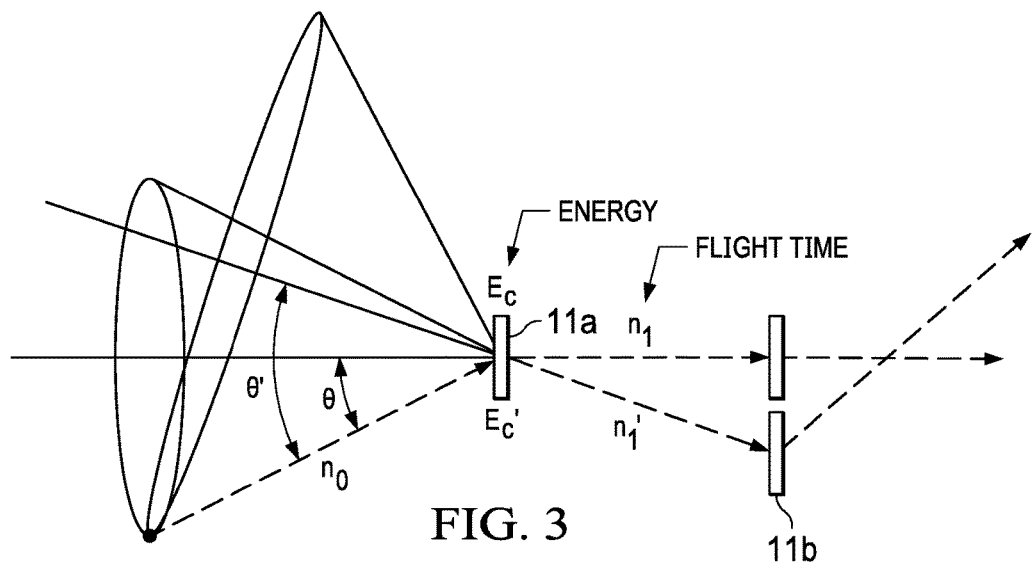
FIG. 3 illustrates the kinematics of a neutron, whose incident energy and direction are unknown, incident on the detector.

FIG. 3 illustrates the kinematics of a neutron, whose incident energy and direction are unknown, incident on the detector 10. The incident neutron is $n_0$, which undergoes two scatterings successively. The path of $n_1$ represents a first scattered neutron (small angle). The path of $n_1'$ represents a second scattered neutron (large angle).

As stated in the Background, neutron detection using diamond detectors relies on carbon-neutron elastic scatterings. For the two-stage neutron detector 10, an assumption is that the energy and momentum of the incident neutron is conserved between the carbon recoil and the scattered neutron. In FIG. 3, the carbon recoil energies of the two scattered neutrons are represented as $E_c$ and $E_c'$. A time of flight (TOF) for each scattered neutron, between the two diamond detectors 11a and 11b is also indicated.

FIG. 3 further represents the "event circle" reconstruction of a neutron that scatters two times successively. The arrival direction of the neutron is within a cone, which may be projected to a surface, and which an event circle.

More specifically, the incident neutron direction lies within the mantle of a cone with a half angle, $\theta$, around the scattered neutron velocity vector. This cone angle is calculated as follows, using conservation of energy and momentum within the system:

$$\tan^2\theta = \frac{\left\{\alpha E_{N1} E_C - \left(\frac{\alpha-1}{2}\right)^2 E_C^2\right\}}{\left\{E_{N1} - \frac{\alpha-1}{2} E_C\right\}^2}.$$

where the incident neutron energy is $E_{N0}$, the resulting carbon recoil energy is $E_C$, the scattered neutron energy is $E_{N1}$, and the carbon mass normalized by the neutron mass is $\alpha$.

As explained below, using detector 10 and related hardware, the energy of the carbon recoil and the scattered neutron are measured (directly or indirectly) simultaneously. The arrival direction of neutrons within the mantle of this cone is then determined.

Figure 4:
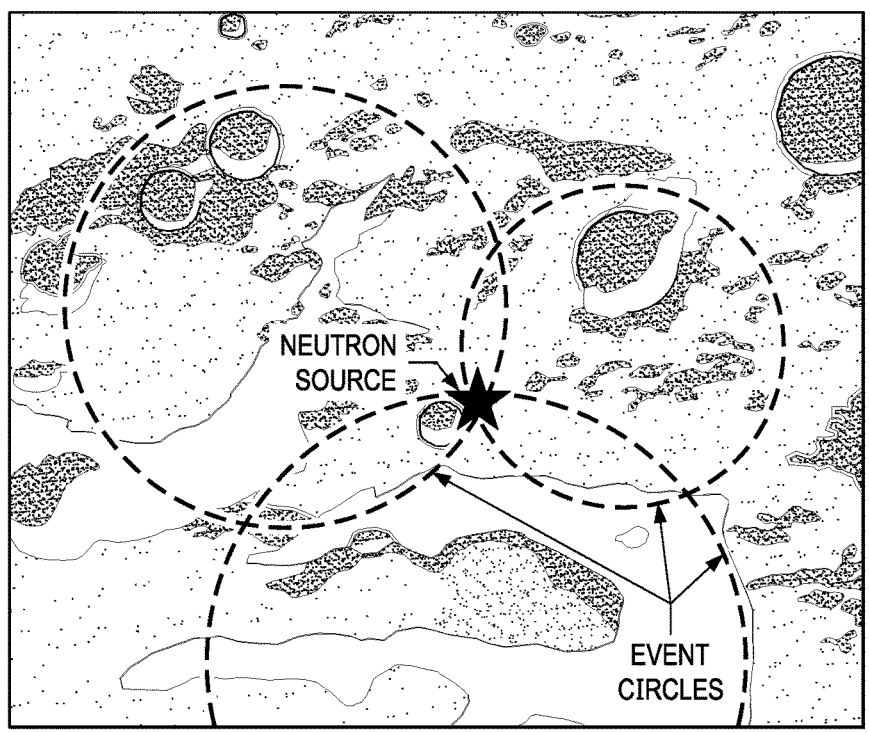
FIG. 4 illustrates how cones representing the arrival direction of a neutron can be projected on a surface as an "event circle", to indicate the probable location of a neutron event.

As illustrated in FIG. 4, each cone can be projected on a surface such as the Moon or asteroid or planet surface, or any other surface having a neutron source. The projection is referred to herein as an "event circle", to indicate the probable location of a single neutron event. FIG. 4 is a simple example of three event circles projected to a planetary surface. Neutron source location is the most probable at the intersection of event circles. Angular resolution is represented by the circumference of event circles. For imaging applications, all valid event circles are superposed for a number of events, and energy-dependent probability maps of neutrons are reconstructed.

Measurement Data

Figure 5:
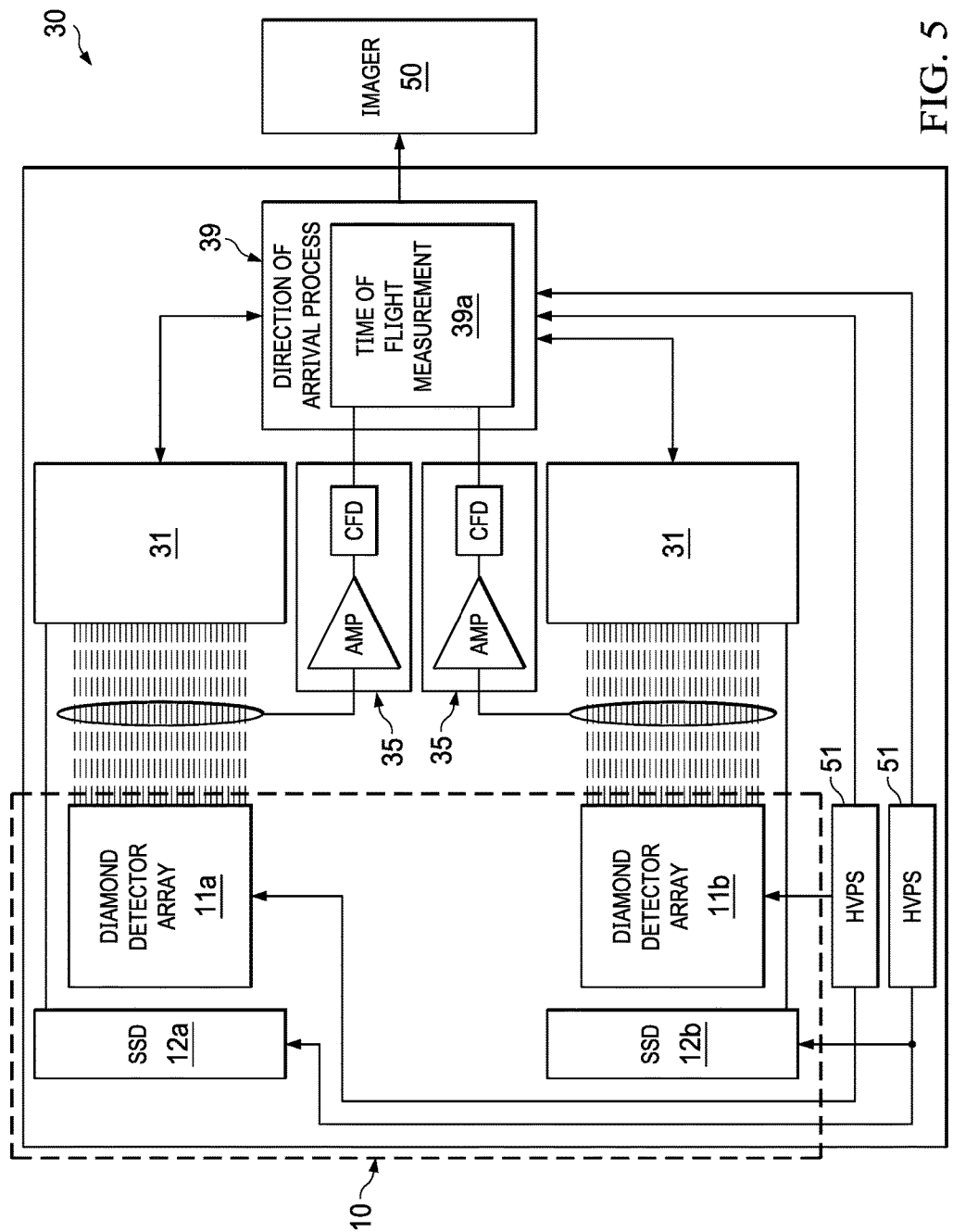
FIG. 5 illustrates a neutron imaging system, which comprises the diamond detector, various measurement and processing equipment, and an imager.

FIG. 5 illustrates a neutron imaging system 30, which comprises detector 10, various measurement circuitry and processing equipment, and an imager 50. As stated above, imaging system 30 measures both carbon recoil energies and neutron arrival timings. The measurement circuitry of FIG. 5 is configured to detect neutrons entering detector 10 from one direction; detection from both directions can be implemented as explained below. A high voltage power supply (HVPS) is used to activate detector 10.

Carbon recoil energy, $E_C$, is measured by pulse height information from first-encountered diamond detector 11a. Raw output signals from detector 10 are delivered to a multi-channel charge-sensitive and shaping amplifier 31. Amplifier 31 may be implemented as an integrated circuit, such as an application specific integrated circuit (ASIC), which also digitizes the shaped pulses. The shaped pulses are then analyzed by a multichannel analyzer, which can be part of the ASIC. Like amplifier 31, the analyzer can be implemented with a digital circuit such as a field programmable gate array (FPGA), referred to herein a direction of arrival process 39. Process 39 is programmed to provide values for $E_C$, based on pulse height measurements and is further programmed to perform additional tasks described below. Examples of suitable analog equipment for a preamplifier, amplifier and analyzer are a Clearpulse 580 K, an Ortec 572A and an Amptek MCA800A, respectively.

For time of flight (TOF) measurements, timing signals of recoils between the pair of detectors 11a and 11b are used. The output of detector 10 is delivered to a response time measurement circuit 35 (here comprising fast charge amplifiers and constant fraction discriminators (CFDs)). As explained below, these response times are a measure of speed of pulses, which make TOF measurements possible. For configuring system 30 for detection of neutrons from both front and back directions, a delay circuit (not shown) may be inserted after circuit 35.

TOF process 39a has appropriate hardware and software to convert the neutron TOF to scattered neutron energy, $E_{N1}$, using the following formula:

$$E_{N1} = \frac{1}{2} M_N \left(\frac{L}{T}\right)^2,$$

where $M_N$ is neutron mass, L is the detector separation distance and T is the flight time. The timing measurement can also be used to separate Compton $\gamma$-ray signals and neutron signals.

With $E_C$ and $E_{N1}$ known, process 39 calculates the cone half-angle, $\theta$, as described above. This cone represents an approximate direction of arrival of the neutron, as described above.

For imaging applications, imager 50 has hardware and software programmed to use cone angles to project event circles to a surface, and to use their intersection to determine a likely neutron event.

Process 39 may be further programmed to use coincidence logic to eliminate responses from particles not of interest, as explained below in connection with FIGS. 8A-8D.

In practice, the cone angle resolutions of event circles are affected by (1) the size of the detector, (2) energy resolution of recoil measurement, (3) timing resolution of the detector response, and (4) timing resolution of the read-out circuit.

Figure 6:
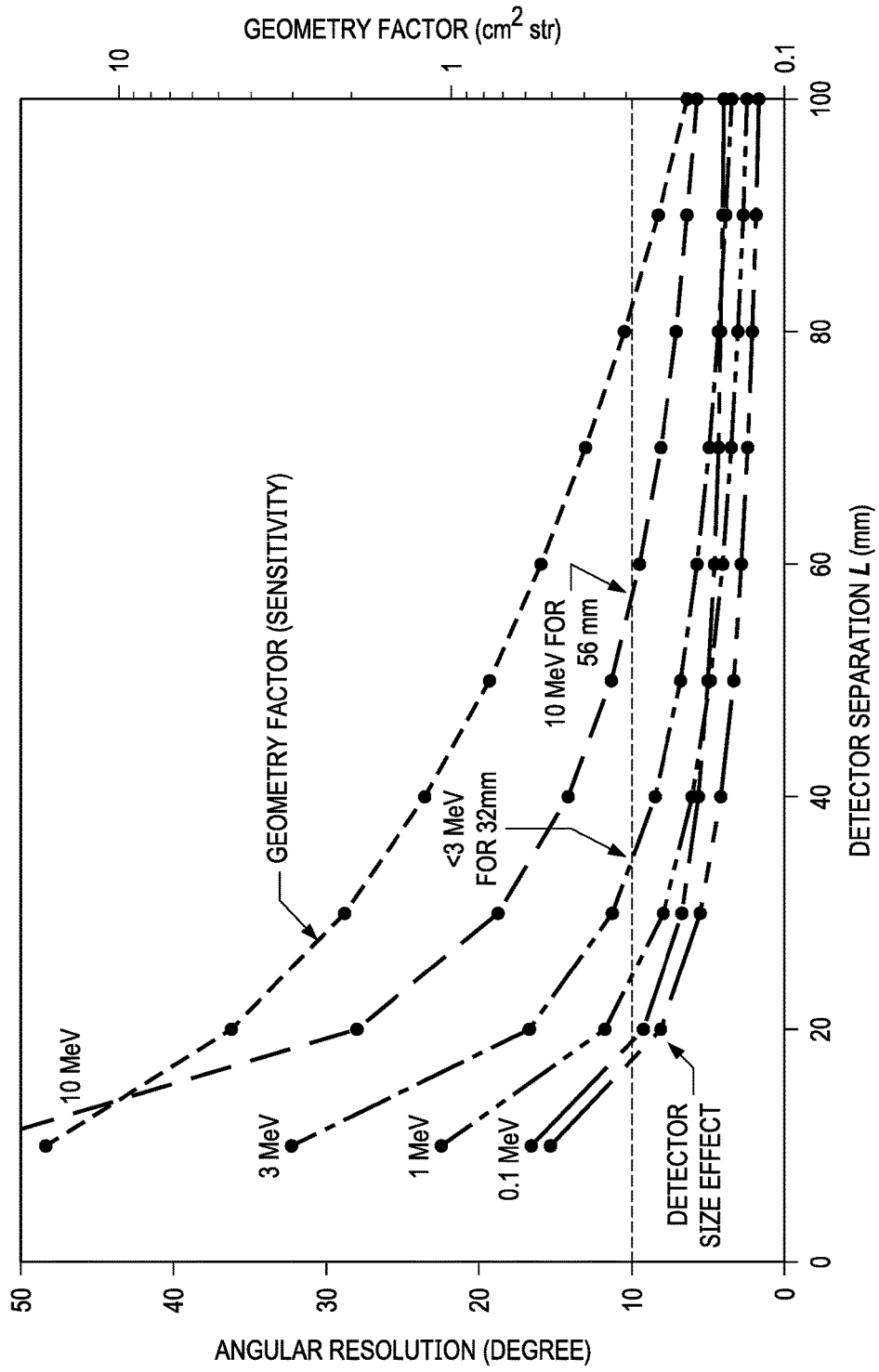
FIG. 6 illustrates the results of Monte Carlo simulations of detector responses, including varying angular resolutions and geometry factors as a function of separation distances between the diamond detector layers.

FIG. 6 illustrates the results of Monte Carlo simulations of detector responses, with varying angular resolutions and geometry factors as a function of separation distances between diamond detector layers 11a and 11b. The targeted angular resolution is 10 degrees or less. The simulations indicate that this 10-degree resolution is possible for an approximately 10 MeV range within a realistic size of detector 10 (less than 60 mm separation) and sensitivity (geometry factor greater than 1 $cm^2$ str). At 56 mm separation, neutrons greater than 3 MeV can be resolved within 5° of angular resolution, and neutrons greater than 10 MeV within 10 degrees. At 32 mm separation, neutrons greater than 3 MeV can be resolved with 10 degrees.

For TOF measurements, a desired resolution of 0.5 ns was established.

Neutron Detection Efficiency

Neutrons ranging from 0.1 to 1 MeV are highly affected by local hydrogen content, and are important for constraining water in the soil. The energy of scattered carbon recoils is described as follows:

$$E_C = \frac{2\alpha}{(1+\alpha)^2}(1-\cos\theta)E_N,$$

From this formula, neutrons lose less than 28% of energy per single event depending on the scattering angles, which are detectable for greater than 0.1 MeV incident energy by diamond detectors 11a and 11b, with a 7 keV threshold.

The efficiency of the elastic scattering ($\varepsilon$) is given by the following formula from Poisson statistics:

$$\varepsilon = 1 - e^{-N\sigma d},$$

where N denotes the atomic number density ($1.8 \times 10^{23}/cm^3$) and the scattering cross section of diamond (~5 barn for greater than 1 MeV). Thus, 13% of the neutrons experience at least one elastic scattering in a 1.5 mm diamond detector 11a or 11b, where each piece is 0.5 mm thick. The efficiency of the double scattering detection is approximately 2% per incident neutron (~0.2% for 0.5 mm diamond) over the target energy range (0.1 to 10 MeV), theoretically.

For diamond detector 10, an expected typical integrated neutron flux over the operation range is about 0.5 to 4 $cm^2/str/s$. For an example detector size of 3×3 arrays with 1.5 mm square and 50 mm separation, the estimated double scattering coincidence count rate will be 2-16 kilo counts/day.

In diamond detectors, neutrons can be measured directly by $^{12}C$ capture reaction modes for greater than 5.7 MeV, including the $^{12}C(n, \alpha)^9Be$ reactions. In this mode, $^9Be$ ions and $\alpha$-particles have a total energy of $E_{\alpha+Be}=E_n-5.7$ MeV, where $E_n$ is the energy of the incident neutrons. Thus, detector 10 can be used for complementary high energy resolution spectroscopy for greater than 5.7 MeV. Because this mode does not operate with double scatterings, the measurement will be omni-directional.

Diamond has the highest atomic density of any material, and consequently has high neutron attenuation efficiency via elastic scattering. In contrast, neutron capture in BC454 neutron detectors, such as those used in the Messenger space mission and in the Lunar Prospector's neutron spectrometer, is less likely per unit volume, because 10B atoms are sparser within the scintillator material.

FIG. 7 is a table summarizing theoretical estimates of linear attenuation coefficients for diamond detector 10 compared to an existing BC454 detector. Neutrons traveling in BC454 may lose energy significantly through moderation. Therefore, their cross sections listed in the table were just multiplied by 10. Consequently, despite the small size of detector 10, its detection efficiency is comparable to existing neutron detectors.

Rejection of Background and Use of Coincidence Logic

Considering the relatively low signal rate of neutrons, background rejection is crucial. During the neutron measurements discussed above, the detector system 30 distinguishes the desired measurement signals from γ-rays, using TOF analysis. Although double Compton scatterings of γ-rays at different arrays can produce double coincidence signals, the TOF's of photons are much shorter and can be discriminated from valid neutron signals.

Referring again to FIG. 1, energetic particles can be rejected using coincidence logic by using thin silicon solid-state detector (SSD) layers 12a and 12b at the top and the bottom of detector 10. All energetic particles will interact with SSDs. Coincidence logic is used to discriminate neutron events from photons and other radiation.

FIGS. 8A-8D illustrate these coincidence logics (detection patterns) for 0.1-10 MeV neutrons, greater than 5.7 MeV neutrons, energetic particles, and γ-rays, respectively.

Figure 8A:
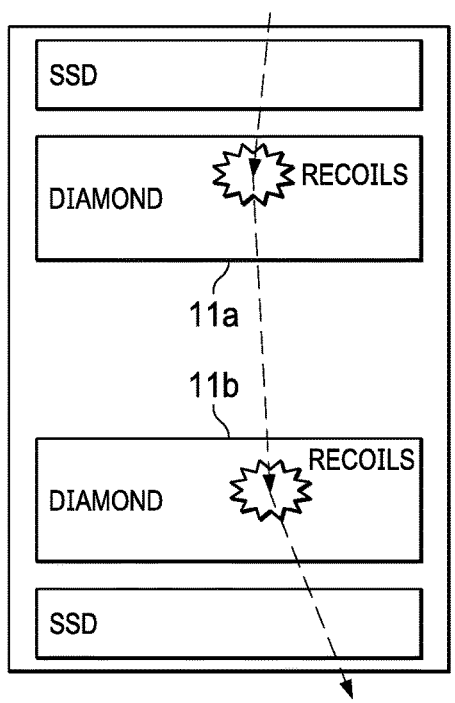
FIGS. 8A-8D illustrate coincidence logics (detection patterns) for 0.1-10 MeV neutrons, greater that 5.7 MeV neutrons, energetic particles, and $\gamma$-rays, respectively.

As illustrated in FIG. 8A, for neutrons between 0.1 and 10 MeV, event circle measurements are made in response to double scattering signals between two diamond layers 11a and 11b. The measurements can be used to obtain high angular resolution.

Figure 8B:
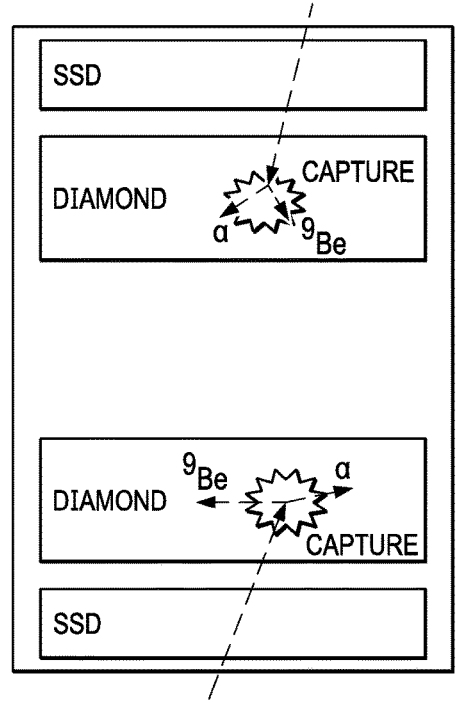

In FIG. 8B, large amplitude neutron signals (greater than 5.7 MeV) may trigger only one diamond detector 11a or 11b. This signal is interpreted as a neutron capture signal, which provides a high-energy resolution measurement. Because captured fission neutrons trigger only one diamond detector array, these neutrons are detected by pulse height measurements.

Figure 8C:
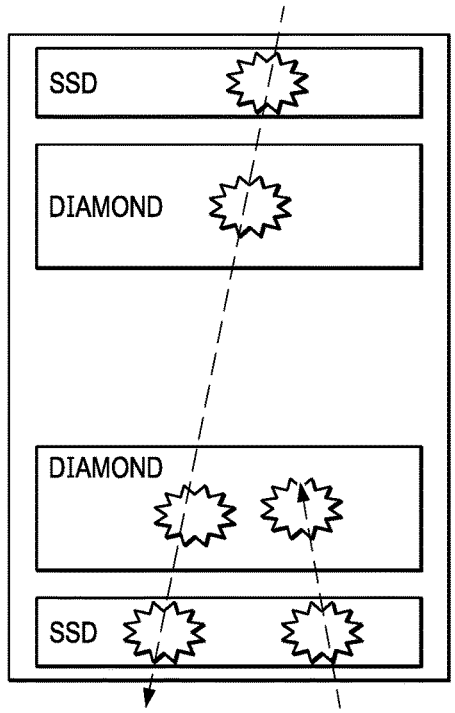

In FIG. 8C, silicon layers 12a and 12b reject energetic particle signals, because these layers are transparent to neutrons and γ-rays. Energetic particles are mainly protons and electrons in space, and cosmic ray muons on the ground. This can be referred to as "anti-coincidence" detection.

Figure 8D:
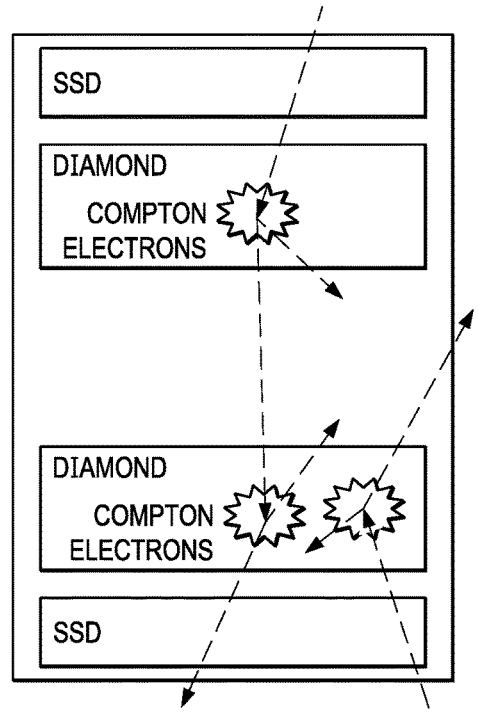

In FIG. 8D, γ-rays can also produce double scattering events via Compton scatterings. However, these contaminations can be rejected based on TOF because the photon TOF is much shorter. Single Compton events can also be rejected based on pulse height, because Compton electrons cannot produce more than~3 MeV signals in a small (such as a<1.5 mm) diamond detector.

Diamond Detector Pulse Height and TOF Details

Figure 9:
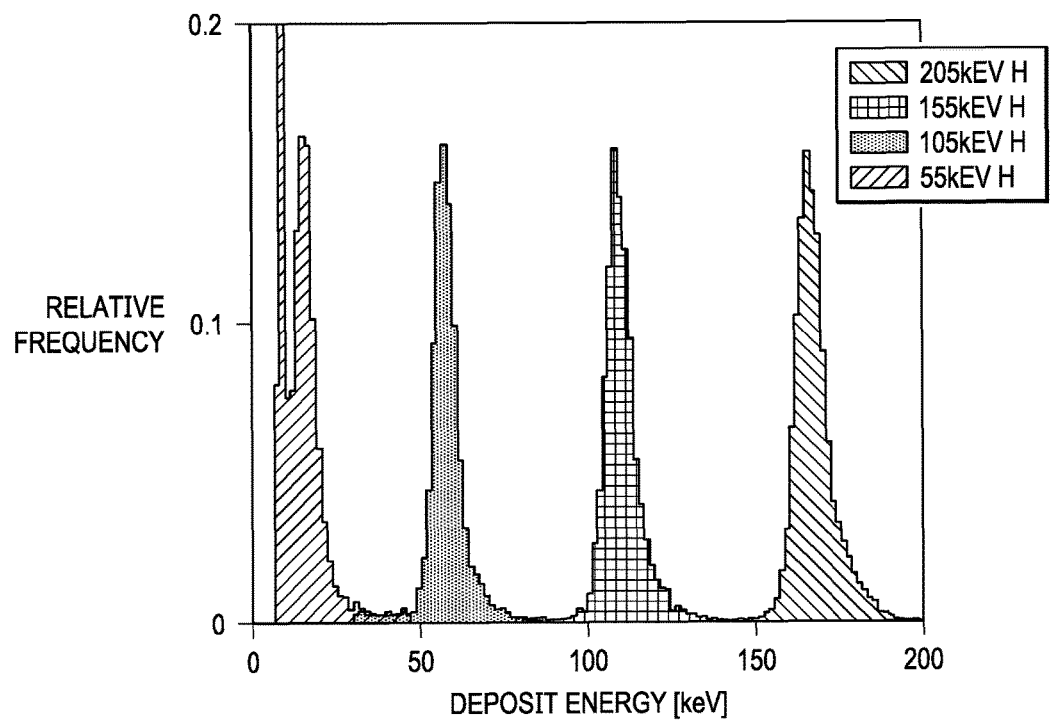
FIG. 9 illustrates pulse height distributions from the diamond detector for energetic protons.

FIG. 9 illustrates pulse height distributions from diamond detectors 11a and 11b for energetic protons. Each pulse height distribution shows clear peaks measured in 50 keV increments, showing linearity of pulse height responses to particle energy. The noise threshold level was equivalent to 7 keV signals.

Figure 10:
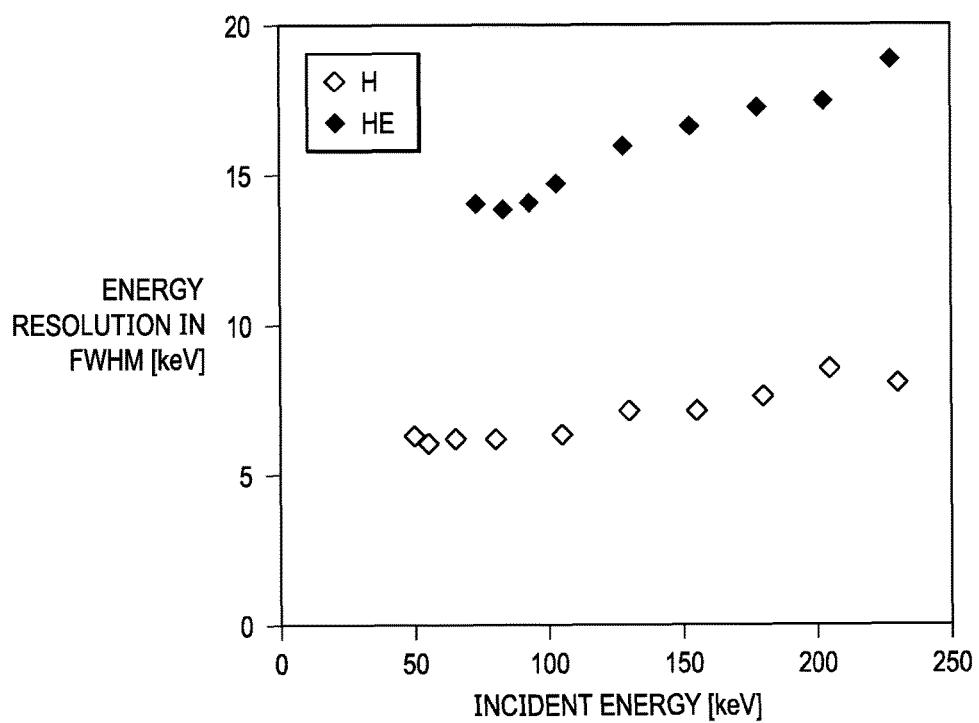
FIG. 10 illustrates the energy resolution (FWHM) of a diamond detector for protons and helium (He) ions.

FIG. 10 shows the energy resolution (FWHM) of a diamond detector, such as detectors 11a and 11b, for protons and helium (He) ions. The energy resolution ranges between 5-10 keV for protons and 14-keV for helium (He) ions. For diamond detector 10, better resolutions and linearity are expected for carbon recoils, because charged particle energies are straggled by the thick surface metal layer, while recoils are produced inside the diamond detectors. Thus, the diamond detectors 11a and 11b are suitable for low-energy recoil measurements in the 10s of keV range.

As stated above, rise time, also referred to herein as response time, is a measure of speed of pulses, and makes the TOF measurements possible. The signal rise time of diamond detectors 11a and 11b is fast because of the high mobility of electrons/holes in diamond crystal. Fast small signals can be represented by penetrating electrons (strontium 90), and slow large signals by alpha particles (Americium 241). The rise time is defined as a voltage increase from 0% to 20%, where the timing signals will be triggered for rise time detector 36.

Figures 11, 12:
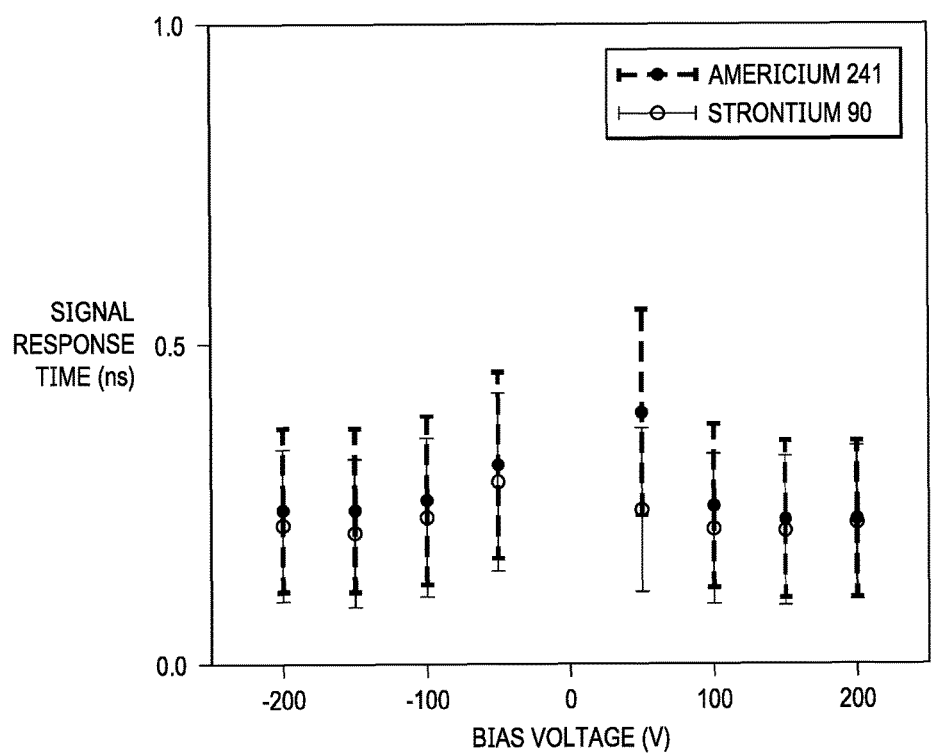
FIG. 11 illustrates signal rise (response) times of the diamond detector as a function of bias voltages.
FIG. 12 describes characteristics of the neutron detection system, as compared to other neutron detection systems.

FIG. 11 illustrates signal rise (response) times of detector 10 as a function of bias voltages, assuring<0.2 ns for the best operation voltage. As shown, the rise time is adequately shorter than the expected electronics capability (0.5 ns) of system 30. Thus, the diamond detectors are feasible for timing analysis of neutrons.

Summary

Neutron detection system 30 uses a combination of diamond detectors and coincidence logics to image neutrons. Diamond detectors have a high tolerance to ionizing radiation.

For space missions and certain nuclear reactor applications, many of the components in previously flown neutron detectors are sensitive to extreme temperatures, which have limited their use on some planetary missions. The diamond detector described herein can operate above 150 degrees C.

The neutron detector system 30 can determine the compositional state and compositional distribution of the volatile component in lunar polar regions or airless small bodies, by making measurements of hydrogen abundances with greater than 10 km spatial resolutions.

FIG. 12 describes characteristics of the neutron detection system 30, as compared to other neutron detection systems, such as LRO/LEND (Lunar Reconnaissance Orbiter/ Lunar Exploration Neutron Detector) and LPNS (Lunar Prospector Neutron Spectrometer). For spatial resolution at altitudes (e.g. 50 km), system 30 satisfies a less than 9 km requirement for a greater than 10 MeV range, and will achieve 4.4 km resolution for a more limited less than 3 MeV range. For low altitude operations (e.g. 10 km), the invention can even achieve sub-km resolution.

There are many connections between abundances and distributions of volatiles with future planetary resource utilization and human exploration. Small and local scale hydrogen abundance data obtained by neutron detection system 30 invention will remotely support lander or rover-based missions for primitive bodies and the Moon.

The invention claimed is:

1. A neutron detector system for detecting the approximate angle of arrival of an incident neutron; comprising:
  a diamond detector, comprising two diamond detector layers, spaced a predetermined distance apart; two silicon layers, one of the two silicon layers associated with each diamond detector layer; wherein the diamond detector layers are both inner layers, and the two silicon layers are outer layers of a sandwich configuration of the diamond detector;
  a pulse height analyzer, operable to measure the pulse height from the diamond detector layer that the incident neutron first encounters, thereby obtaining pulse height data;
  a response time measurement circuit, operable to measure the response time of a recoil between the diamond detector layers, thereby obtaining response time data; and
  a direction of arrival process programmed to calculate carbon recoil energy based on pulse height data, to calculate scattered neutron energy based on response time data, and to calculate a direction cone, representing an approximate direction of arrival of the incident neutron, based on carbon recoil energy and scattered neutron energy.

2. The system of claim 1, further comprising an imager programmed to generate a neutron event image, based on several direction cones.

3. The system of claim 1, wherein the direction of arrival process is further programmed to use coincidence logic to eliminate responses from particles not of interest.

4. The system of claim 1, wherein each diamond detector is an array of diamond detector pieces.

5. The system of claim 1, wherein each silicon layer is a thin silicon solid state detector layer.

6. The system of claim 1, wherein the detector is operable to detect neutrons incident first on only one of the silicon layers.

7. The system of claim 1, wherein the detector is operable to detect neutrons incident first on either silicon layer.

8. A method of detecting the arrival direction of an incident neutron, comprising:
  scattering the incident neutron, using a diamond detector comprising: two diamond detector layers, spaced a predetermined distance apart; two silicon layers, one of the two silicon layers associated with each diamond detector layer; wherein the diamond detector layers are both inner layers, and the two silicon layers are outer layers of a sandwich configuration of the diamond detector;
  measuring the energy of a carbon recoil resulting from the scattering;
  measuring the time of flight of a scattered neutron within the detector;
  calculating the energy of the scattered neutron, based on the time of flight; and
  calculating a half angle, θ, of a cone around the direction of arrival of the incident neutron, based on carbon recoil energy and scattered neutron energy.

9. The method of claim 8, wherein the energy of the carbon recoil is measured from pulse height information of the diamond detector first in the path of the incident neutron.

10. The method of claim 8, wherein the energy of the scattered neutron is calculated further based on the separation distance of the detectors.

11. The method of claim 8, further comprising eliminating measurements from energetic particles using coincidence logic.

12. The method of claim 8, further comprising detecting large amplitude neutrons from only pulse height measurements.

13. The method of claim 8, further comprising rejecting gamma rays based on time of flight measurements.

14. The method of claim 8, wherein the detector is operable to detect neutrons incident first on only one of the silicon layers.

15. The system of claim 8, wherein the detector is operable to detect neutrons incident first on either silicon layer.

* * * * *